US007949674B2

(12) United States Patent
Middelfart

(10) Patent No.: US 7,949,674 B2
(45) Date of Patent: May 24, 2011

(54) INTEGRATION OF DOCUMENTS WITH OLAP USING SEARCH

(75) Inventor: Morten Middelfart, Hjorring (DK)

(73) Assignee: Targit A/S, Hjorring (DK)

( * ) Notice: Subject to any disclaimer, the term of this patent is extended or adjusted under 35 U.S.C. 154(b) by 140 days.

(21) Appl. No.: 11/509,832

(22) Filed: Aug. 24, 2006

(65) Prior Publication Data

US 2008/0016035 A1    Jan. 17, 2008

(30) Foreign Application Priority Data

Jul. 17, 2006  (DK) ................................ 2006 00988

(51) Int. Cl.
*G06F 17/30* (2006.01)
*G06F 7/00* (2006.01)
(52) U.S. Cl. ........ 707/769; 707/600; 707/706; 707/759; 715/234
(58) Field of Classification Search .................. None
See application file for complete search history.

(56) References Cited

U.S. PATENT DOCUMENTS

| | | | |
|---|---|---|---|
| 4,800,510 A | 1/1989 | Vinberg et al. | |
| 5,611,034 A | 3/1997 | Makita | |
| 5,692,181 A | 11/1997 | Anand et al. | |
| 5,884,302 A | 3/1999 | Ho | |
| 5,911,138 A | 6/1999 | Li et al. | |
| 5,940,518 A | 8/1999 | Augustyn et al. | |
| 6,108,657 A | 8/2000 | Shoup et al. | |
| 6,160,549 A | 12/2000 | Touma et al. | |
| 6,226,647 B1 | 5/2001 | Venkatasubramanian et al. | |
| 6,415,298 B1 | 7/2002 | Oesterer et al. | |
| 6,418,441 B1 | 7/2002 | Call | |
| 6,484,179 B1 * | 11/2002 | Roccaforte | 707/737 |
| 6,490,590 B1 | 12/2002 | Fink | |
| 6,615,172 B1 | 9/2003 | Bennett et al. | |
| 6,625,617 B2 | 9/2003 | Yarnall et al. | |
| 6,643,635 B2 | 11/2003 | Nwabueze | |
| 6,647,363 B2 | 11/2003 | Claassen | |
| 6,671,689 B2 * | 12/2003 | Papierniak | 707/100 |
| 6,775,675 B1 | 8/2004 | Nwabueze et al. | |
| 6,816,879 B1 | 11/2004 | Kiritzov et al. | |

(Continued)

FOREIGN PATENT DOCUMENTS

EP    0961439    12/1999

(Continued)

OTHER PUBLICATIONS

Perez, J. M. et al. "A Relevance-Extended Multi-Dimensional Model for a Data Warehouse Contextualized with Documents" *DOLAP* (2005) p. 19-28.

(Continued)

*Primary Examiner* — Greta L. Robinson
*Assistant Examiner* — James J Wilcox
(74) *Attorney, Agent, or Firm* — Buchanan Ingersoll & Rooney PC

(57) ABSTRACT

A computer-implemented method for providing a search result is disclosed. The method comprises, making a presentation of a dataset with structured data; and storing metadata items that define the dataset from a data superset that is stored in a first database with structured data. The method also comprises converting the metadata items to a search request, submitting the search request to a search engine to search for documents located in second database; capturing the search result; and making a presentation of the search result.

20 Claims, 4 Drawing Sheets

U.S. PATENT DOCUMENTS

| | | | |
|---|---|---|---|
| 6,873,993 | B2 | 3/2005 | Charlesworth et al. |
| 6,889,230 | B1 | 5/2005 | Rogers |
| 7,010,523 | B2 * | 3/2006 | Greenfield et al. ............... 707/3 |
| 7,051,038 | B1 | 5/2006 | Yeh et al. |
| 7,103,591 | B2 | 9/2006 | Asobayire et al. |
| 7,170,519 | B2 | 1/2007 | Patel et al. |
| 7,171,335 | B2 | 1/2007 | Liu et al. |
| 7,209,876 | B2 | 4/2007 | Miller et al. |
| 7,293,031 | B1 | 11/2007 | Dusker et al. |
| 2001/0013004 | A1 | 8/2001 | Haris et al. |
| 2002/0038230 | A1 | 3/2002 | Chen |
| 2002/0059183 | A1 | 5/2002 | Chen |
| 2002/0059195 | A1 | 5/2002 | Cras et al. |
| 2002/0062290 | A1 | 5/2002 | Ricci |
| 2002/0070953 | A1 | 6/2002 | Barg et al. |
| 2002/0087516 | A1 | 7/2002 | Cras et al. |
| 2002/0091681 | A1 | 7/2002 | Cras et al. |
| 2002/0129004 | A1 | 9/2002 | Bassett et al. |
| 2002/0156714 | A1 | 10/2002 | Gatto |
| 2002/0184024 | A1 | 12/2002 | Rorex |
| 2003/0009295 | A1 | 1/2003 | Markowitz et al. |
| 2003/0050825 | A1 | 3/2003 | Gallivan et al. |
| 2003/0061096 | A1 | 3/2003 | Gallivan et al. |
| 2003/0061358 | A1 | 3/2003 | Piazza et al. |
| 2003/0071814 | A1 | 4/2003 | Jou et al. |
| 2003/0088564 | A1 | 5/2003 | Lohmann et al. |
| 2003/0101119 | A1 | 5/2003 | Parsons et al. |
| 2003/0120593 | A1 | 6/2003 | Bansal et al. |
| 2003/0126136 | A1 | 7/2003 | Omoigui |
| 2003/0158795 | A1 | 8/2003 | Markham et al. |
| 2003/0193502 | A1 | 10/2003 | Patel et al. |
| 2004/0039707 | A9 | 2/2004 | Ricci |
| 2004/0059705 | A1 | 3/2004 | Wittke et al. |
| 2004/0193576 | A1 | 9/2004 | Petculescu et al. |
| 2004/0230585 | A1 | 11/2004 | Middelfart |
| 2005/0076045 | A1 | 4/2005 | Stenslet et al. |
| 2005/0192931 | A1 | 9/2005 | Rogers |
| 2005/0198042 | A1 | 9/2005 | Davis |
| 2005/0210389 | A1 | 9/2005 | Middelfart |
| 2005/0223093 | A1 | 10/2005 | Hanson et al. |
| 2006/0106843 | A1 | 5/2006 | Middelfart et al. |
| 2006/0149407 | A1 | 7/2006 | Markham et al. |
| 2007/0174262 | A1 | 7/2007 | Middelfart |
| 2008/0301539 | A1 | 12/2008 | Middelfart et al. |
| 2009/0187845 | A1 | 7/2009 | Middelfart |

FOREIGN PATENT DOCUMENTS

| | | |
|---|---|---|
| EP | 1081610 A2 | 3/2001 |
| EP | 1081611 A2 | 3/2001 |
| EP | 1 477 909 | 11/2004 |
| EP | 1 574 969 A1 | 9/2005 |
| EP | 1 577 808 A1 | 9/2005 |
| EP | 1 659 503 A1 | 5/2006 |
| WO | WO 82/00726 | 3/1982 |
| WO | WO 97/08604 A2 | 3/1997 |
| WO | WO 01/09780 A1 | 2/2001 |
| WO | WO 01/35256 A2 | 5/2001 |
| WO | 0182135 A1 | 11/2001 |
| WO | WO 2004/102416 A2 | 11/2004 |

OTHER PUBLICATIONS

Notice of Allowance dated Aug. 12, 2009 from related U.S. Appl. No. 10/556,214.

Notice of Allowance dated Sep. 8, 2009 from related U.S. Appl. No. 10/802,509.

Notice of Allowance dated Sep. 8, 2009 from related U.S. Appl. No. 10/991,302.

Abualsamid, Ahmad. "PHP & Hosted Applications: A flexible scripting language for building dynamic web pages", Dr. Dobb's Journal (2001), 26(1): 56, 58, 60-63.

Spiers, Andrew, "Creating Dynamic WBMP images using PH?", WMLScript.com, (Jan. 13, 2001) pp. 1-3.

Royappa, Andrew V. "The PHP Web Application Server" Journal of Computing in Small Colleges (2000), 15(3): 201-211.

"L interface avec une base de données", Université Paris, (Oct. 18, 2000), pp. 1-4, Retrieved from http://web.archive.org/web/20001018225046.

Internet Archive Wayback Machine Search Results for "http://margotte.univ. Paris 1.fr/webcurse/html sql.html", Oct. 18, 2000. Retrieved from http://web.archive.org/web.

"Les bases de données relationnelles, Chapitre 25: les échanges de données," (Jan. 3, 2003), pp. 1-6. Retrieved from http://cerig.efpg.inpg.fr/tutoriel/bases-de-donness/chap25.htm.

"Importer Et Exporter Avec Excel, Source No. 3673," Visual Basic Code Sources, (Jun. 19, 2002) pp. 1-2. Retrieved from http://www.vbfrance.com/code.aspx?ID = 3673.

Form PCT/ISA/210 (International Search Report) dated Dec. 5, 2007, issued in corresponding International Application PCT/DK2007/000232.

Form PCT/ISA/237 (Written Opinion of the International Searching Authority) dated Dec. 5, 2007 issued in corresponding International Application PCT/DK2007/000232.

B. Azvine et al., "Intelligent Process Analytics for CRM", BT Technology Journal, Jan. 2006, vol. 24, No. 1, pp. 60-69, XP-019392378, Kluwer Academic Publishers.

Pawan Chowdhary et al., "Enterprise Integration and Monitoring Solution Using Active Shared Space", Proceedings of the 2005 IEEE International Conference on e-Business Engineering (ICEBE'05), Oct. 12, 2005, pp. 665-672, XP-010860530, The Compute Society.

Russell Barr et al., "Real Time Modeling for Financial and Performance Management", Cement Industry Technical Conference, IEEE, May 15-20, 2005, pp. 43-51, XP-010840065.

Form PCT/ISA/210 (International Search Report) dated Nov. 11, 2004, issued in corresponding International Application PCTDK2004000347.

Michelle X. Zhou & Sheng Ma, "Representing and Retrieving Visual Presentations for Example-Based Graphics Generation," Proceedings, 1st International Symposium on Smart Graphics, Hawthorne, NY, USA (Mar. 21-23, 2001), pp. 87-94.

Aloia, N., "Design of Multimedia Semantic Presentation Templates: Options, Problems and Criteria of Use." Proceedings of the Working Conference on Advanced Visual Interfaces, ACM Press (1998) pp. 205-215.

Mackinlay, J., "Automating the Design of Graphical Presentations of Relational Information" ACM Transactions on Graphics (vol. 5) (No. 2) (1986) pp. 110-141.

Office Action dated Mar. 20, 2007 from related U.S. Appl. No. 10/302,509.

Office Action dated Jul. 18, 2006 from related U.S. Appl. No. 10/802,509.

Office Action dated Dec. 11, 2007 from related U.S. Appl. No. 10/802,509.

Office Action dated Dec. 15, 2008 from related U.S. Appl. No. 10/802,509.

Office Action dated Feb. 5, 2008 from related U.S. Appl. No. 10/991,302.

Office Action dated Jun. 22, 2007 from related U.S. Appl. No. 10/991,302.

Office Action dated Jun. 22, 2009 from related U.S. Appl. No. 10/991,302.

Office Action dated Oct. 2, 2008 from related U.S. Appl. No. 10/991,302.

Office Action dated Mar. 20, 2007 from related U.S. Appl. No. 10/449,811.

Office Action dated May 4, 2009 from related U.S. Appl. No. 10/449,811.

Office Action dated Jul. 18, 2006 from related U.S. Appl. No. 10/449,811.

Office Action dated Sep. 15, 2008 from related U.S. Appl. No. 10/449,811.

Office Action dated Nov. 10, 2005 from related U.S. Appl. No. 10/449,811.

Office Action mailed Dec. 18, 2007 from related U.S. Appl. No. 10/449,811.

Office Action mailed Sep. 23, 2008 from related U.S. Appl. No. 10/556,214.

EP Search Report dated Dec. 18, 2008 from EP Application No. 07 38 8055 corresponding to U.S. Appl. No. 11/509,832.

Becks, A., "SEWASIE—Specification of the Interface Design" XP002300607, Retrieved from the Internet: URL: http://www.sewasie.org/documents/D-4-4-interface-design.pdf> [retrieved on Oct. 13, 2004].

W. Cody et al., "The Integration of Business Intelligence and Knowledge Management" XP002300608, Retrieved from the Internet: URL: http://www.research.ibm.com/journal/sj/414/cody.pdf> [retrieved on Oct. 13, 2004].

Becks, A., "SEWASIE—Specification of the Architecture of the Monitoring Agent/Visualization Component" XP002300606, Retrieved from the Internet: URL: http://www.sewasie.org/documents/D-4-1-monitoring-agent-architecture.pdf> [retrieved on Oct. 13, 2004].

Communication from European Patent Office dated Jul. 28, 2004 from related EP Application No. 04388019.

Johnson et al., History data facility in the SLC control system, May 6-9, 1991, IEEE, vol. 3, 1540-1542.

Priebe et al., Ontology-based integration of OLAP and information retrieval, Sep. 1-5, 2003, IEEE, 610-614.

Communication dated Mar. 6, 2009 from related EP Application No. 04 388 077.2 corresponding to U.S. Appl. No. 10/991,302.

Communication dated Sep. 2, 2008 from EP Application No. 08 15 5432 corresponding to U.S. Appl. No. 12/112,178.

"MicroStrategy Introduces Next-Generation Dynamic Enterprise Dashboards" Thomasnet Industrial Newsroom, [Online] Jan. 22, 2007, XP002491679 Retrieved from the Internet: URL:http://news.thomasnet.com/fullstory/802157> [retrieved on Feb. 25, 2010].

Technologies4Targeting Ltd.: "Cognos Visualizer—Corporate dashboards that give managers insight to make better decisions" Internet Article, [Online] 2004, XP002491680 Retrieved from the Internet: URL:http://www.tech4t.co.uk/pages/cognos_visualizer.html> [retrieved on Feb. 25, 2010].

Chaudhuri S et al: "An Overview of Data Warehousing and OLAP Technology" SIGMOD Record, ACM, New York, NY, US, vol. 26, No. 1, Mar. 1, 1997, pp. 65-74, XP002193792 ISSN: 0163-5808.

Microstrategy Incorporated: "MicroStrategy 8 Frequently Asked Questions (FAQ)" Internet Article, [Online] 2005, XP002491681 Retrieved from the Internet: URL:http://www.firstbi.com.tw/download/8.0%20FAQ.pdf> [retrieved on Feb. 25, 2010].

Communication dated Aug. 10, 2007 from EP Application No. 04 388 077.2 corresponding to U.S. Appl. No. 10/991,302.

Communication dated Oct. 29, 2009 from EP Application No. 04 388 077.2 corresponding to U.S. Appl. No. 10/991,302.

Targit, Targit Analysis 2K3 Technical White Paper, Jul. 2003, Targit, Version 1.2, pp. 1-9.

Pedersen et al., Achieving Adaptivity for OLAP-XML Federations, Nov. 7, 2003, DOLAP '03, pp. 25-32.

Notice of Allowance dated Jul. 16, 2010 from related U.S. Appl. No. 10/449,811.

Office Action dated May 4, 2010 from related U.S. Appl. No. 11/802,509.

* cited by examiner

INTEGRATION OF DOCUMENTS WITH OLAP USING SEARCH

TECHNICAL FIELD

The technical field is that of making a presentation of a dataset with structured data. The structured data are provided from a so-called OLAP database, a first database, where numbers and aggregations of numbers are stored in a structure defined by so-called dimensions and measures. These terms are well-known in the field of databases. Metadata items such as names of dimensions, measures and criteria define the dataset from a data superset that is stored in the first database with structured data.

BACKGROUND

Current data warehouse and OLAP technologies can be applied to analyze the structured data that organisations store in their databases. These organisations also produce many documents and use the web as their largest source of external information. Examples of internal and external sources of information include e.g. reports on purchase trends and market-research.

The term OLAP designates a category of databases, applications and technologies that allow the collection, storage, manipulation and reproduction of multidimensional data, with the goal of data analysis. Typically, OLAP databases comprise one—or at least fewer—tables than a comparable relational database. OLAP databases typically store pre-computed aggregations of data to make aggregated figures readily available for data analysis purposes.

Databases for analysis purposes and their user interfaces are more and more frequently used by people with no specialist knowledge of databases as a powerful tool to present and analyse facts collected within their sphere of profession. These people take to the databases driven by a desire to be able to more efficiently gain insight into the facts relevant to their profession.

However, there seems to be an ever lasting demand for increased performance of such database tools and a demand for improved efficiency in use of such tools. A simple, but highly relevant measure of efficiency in use of such tools is the number of user interactions required to arrive at a desired result. Another measure is the complexity of the interactions. If the user, who may not be a database expert, experiences that the complexity of the userinteractions is relatively high and also is somehow beside his expectations of what is required to arrive at a desired result, the user tends to get annoyed or frustrated and may give up using the database tool.

PRIOR ART

Generally, different systems for search and information retrieval are known.

EP 1 477 909 discloses different aspects of identifying, storing, retrieving and otherwise handling metadata in relation to a multidimensional database where structured data are stored in the database.

"A Relevance-Extended Multi-dimensional Model for a Data Warehouse Contextualized with documents" by Juan Manuel Perez and Torben Bach Pedersen et al 2005 discloses a combination of a traditional data warehouse and a document data warehouse, resulting in a contextualized warehouse. This—contextualized—warehouse can keep a historical record of the facts, described by the data, and their context as described by the documents. A special OLAP cube called an R-cube is described. R-cubes are characterized by two special dimensions: a relevance dimension, measuring the relevance of each fact in a selected analysis context, and a context dimension, relating each fact with the documents that explain their circumstances. An architecture for the integration of a data warehouse of structured data with a document warehouse of unstructured documents is disclosed. The document warehouses can be used to store unstructured information from organisations' internal and external sources e.g. in an XML format.

However, R-cubes require a special structure with additional dimensions that are to be installed with precompiled information on document relevance. This involves an additional effort in setting up, updating and maintaining an R-cube compared to an ordinary OLAP cube. When new documents arrive or are to be stored in the document database, a re-computation of the relevance measure seems to be required.

A user knowing that a relevant document exists, which is not yet stored in the document database, will experience low performance of the system and may start to search for the document by whatever search tool that is available to him. However, this search will likely be considered by the user to be beside his expectations to an R-cube in respect of: what is required to arrive at the relevant document.

SUMMARY

There is provided a computer-implemented method comprising: making a presentation of a dataset with structured data; and storing metadata items that define the dataset from a data superset that is stored in a first database with structured data. Further, the method comprises converting the metadata items to a search request; submitting the search request to a search engine to search for documents located in a second database; capturing the search result; and making a presentation of the search result.

A user is thus relieved of the task of specifying the search request—often involving time consuming trial-and-error. The number of user-interactions needed from a user to prepare a search is significantly lowered.

The discovered fact that metadata comprises valuable information not only for retrieving structured data, but also for searching for documents is leveraged. Thereby it is possible to automatically search for documents by automatically preparing search requests from a context where data analysis of structured data is performed. Consequently, the functionality of the database is greatly improved while efficiency is also improved. Since the search for documents can be extended to a second database and beyond the first database, where structured data are stored, the load on setting up and maintaining the database containing the structured data is hardly increased, while a far more dynamic approach to document retrieval from a structured data analysis context is provided.

There is also provided a computer-implemented method comprising: requesting a search engine to perform a search assigned to a search string to provide a search result; capturing the search result; and making a presentation of the search result. The search string is prepared by: taking a set of metadata items that defines a dataset from a data superset; and preparing different search requests, from different subsets of the metadata items, for different searches; wherein the search result comprises different result sets.

Thereby a search can be performed automatically—relieving the user of the mental task of considering how to perform a search and then actually performing a search. Since it is leveraged that metadata comprises useful information for document search and since this information is conveyed on so as to perform different searches based on this information, the likelihood of retrieving a document is greatly improved. The search requests can be prepared to have different scopes thereby allowing the user simply to browse results. Results can be browsed by browsing different result sets corresponding to different search requests, by browsing one result set at a time. Alternatively, results can be browsed by browsing a collection of results made up of results from different result sets. This browsing is found to be far more relevant for a user than actually performing the search which is considered being somewhat beside the primary objective of identifying the relevant document.

The data superset can be stored in a first database and the different searches can be performed in peripheral data sources. The first database can be a multidimensional database or a database emulated to appear as a multidimensional database; the peripheral data sources can comprise other databases, disks, file servers, internet resources, etc. comprising any type of volatile or non-volatile memory.

The search requests can comprise requests directed to a search for metadata of documents.

The method can comprise converting a metadata item related to a time dimension into search requests that address metadata of documents. Thereby documents matching the search request (only) on its metadata can be revealed by the search; this is important since it is discovered that information on time is seldom useful in a free-text search. However, the metadata in the documents will often reflect the time-relevance of the document.

The method can also comprise converting metadata items into words and to translate the words from one language into another language. Words denoting e.g. names of measures and dimensions are often provided in a natural language e.g. the English language. The language such words belongs to is also denoted a base language since the words represent properties of the database or data contained therein. A user can be provided with an interface to the database where translations of these words are used. Thereby one or more user languages different from the base language can be supported. Further, the search requests can be prepared in different language versions to extend the scope of the search to document collections in other languages. It should be noted that the base language need not be consistent with a natural language it could be an artificial language e.g. comprising words of different natural languages and/or comprising artificial words (i.e. words that are not natural language words). An appropriate translation is selected so as to provide a desired translation.

Preparing the different search requests by removing and/or altering the metadata items, from the metadata set, selected for the different search requests can also be performed. Thereby it is possible to automatically run searches which are different in scope; the different scopes and respective results can be ranked.

Modifying a document to supply it with content of a search request so as to ensure information co-occurring in the search request and the document can also be performed. Thereby the likelihood of being able to retrieve the document again in the same context is greatly improved. This is especially important since a user may have found a highly relevant document which it could be desired to retrieve again at a later point in time—by the same user or another user which may benefit from a previous user having performed the same analysis previously. Supplying the document with content of the search request can be performed automatically or in response to a user explicitly marking the document as relevant.

The method can also comprise establishing a link from the search request to the document and/or from the document to the search request. Thereby it is possible to map the search request to one or more link(s) which locates the document. This can be performed automatically or in response to a user explicitly marking the document as relevant.

There is also provided a computer-readable medium encoded with a program which, when loaded into a computer, makes the computer perform the above method. Moreover, there is provided a computer encoded with a program which, when loaded into the computer, makes the computer perform the method.

BRIEF DESCRIPTION OF THE DRAWING

A detailed description is provided with reference to the drawing, in which.

DETAILED DESCRIPTION

A dimension is a collection of data of the same type; it provides for structuring a multidimensional database. A multidimensional database is typically defined as a database with at least three independent dimensions. Measures are data structured by dimensions. In a measure, each cell of data is associated with one single position in a dimension. Dimensions and measures are designated by their names. Dimensions can have parameters or dimension values which specify values or ranges of values of the dimension for which associated values of the measures are selected. Measures, dimensions and dimension values are also denoted metadata items and can be combined in a set of metadata items. Such metadata items can specify a data subset from a data superset which is stored in a database. The metadata set is often made independent of any specific query syntax used for the step of actually retrieving the data subset from the database.

Special modules may be provided to transform operational data from a source database or transaction database to analytical data in a data warehouse. In some situations it may be inconvenient to transform the operational data to analytical data which are stored in another database. Therefore the operational database, which is typically a relational database, can be emulated such that it exposes an interface by means of which the operational database appears and is accessible as a multidimensional database. In the below, the term database can designate any type of database whether analytical or transactional.

Figure 1:
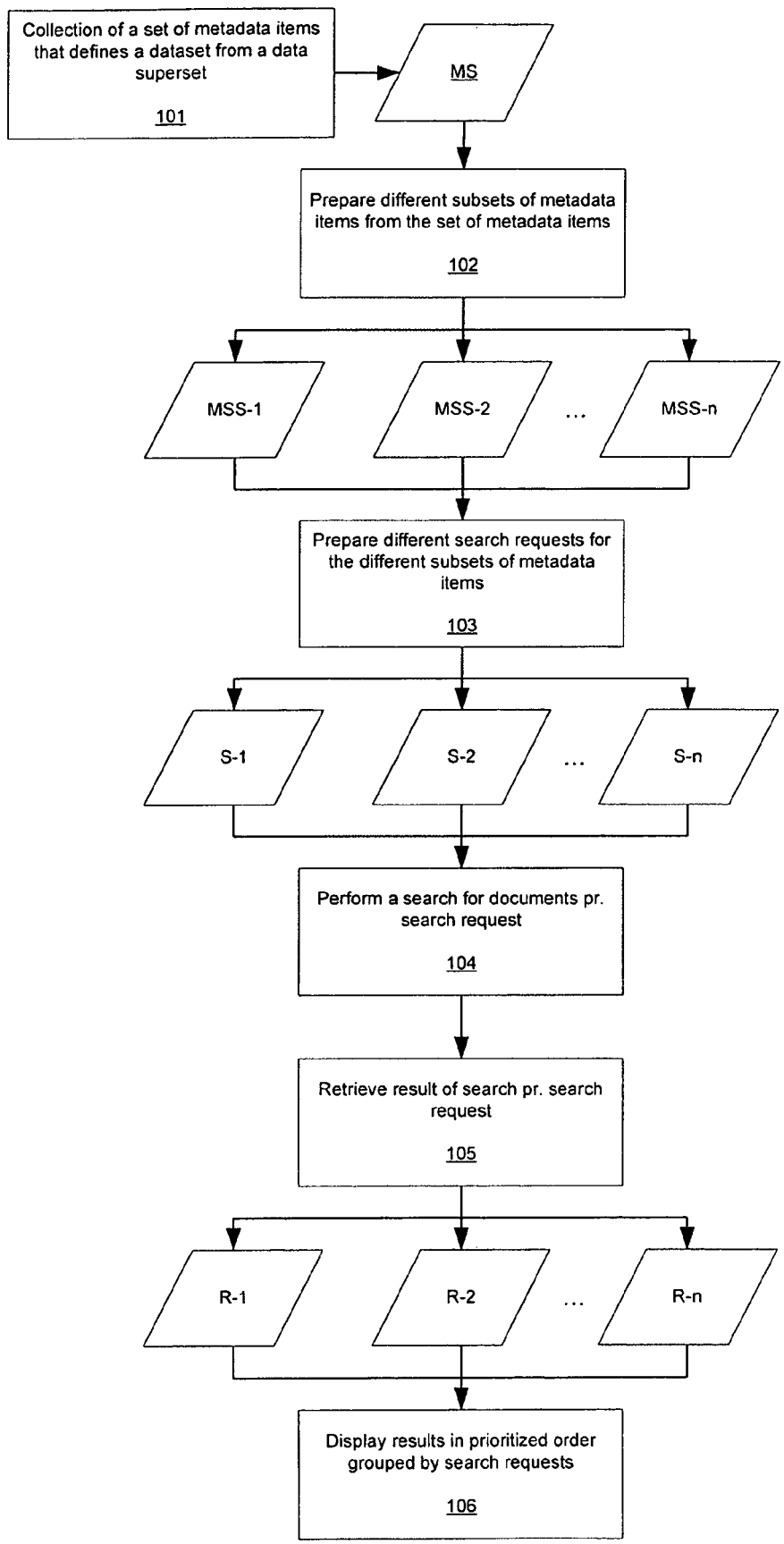
FIG. 1 shows a flowchart of preparing and performing a search from metadata.
Figure 2:
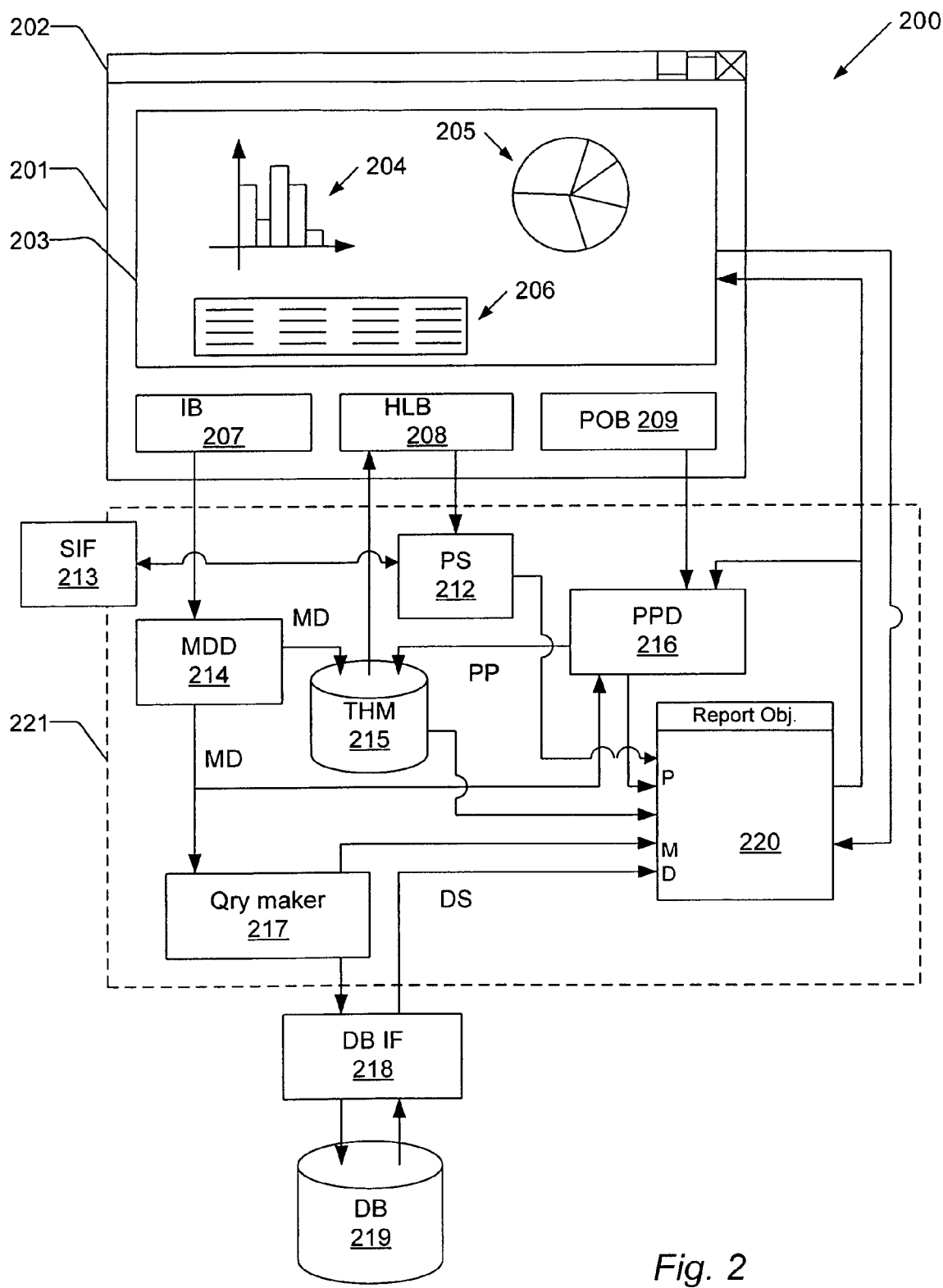
FIG. 2 shows a block diagram of a system of preparing and performing searches from metadata.

FIG. 1 shows a flowchart of preparing and performing a search from metadata. In step 101 a set of metadata items that defines a dataset from a data superset is collected. The set of metadata items can be collected by means of a system as shown in FIG. 2 where the set metadata items can be the set of metadata that defines data currently viewed.

As an example, the set of metadata can be like the following in an exemplary format:

{REVENUE; TIME_MONTH;
 COUNTRY="Hungary"; PRODUCT="Jeans";
 TIME_YEAR="2006"} where items of the metadata set are enclosed by curled parentheses and separated by semicolons. The words in capital letters designate names of measures or dimensions of the multi-dimensional. The names of some of the dimensions are followed by an equal-sign and a parameter that designates a dimension value or range of values. The database will be prepared with information which contains information about which names are measures and which are dimensions. In this example the database may be prepared to determine that REVENUE is a measure and TIME_MONTH is a dimension and that COUNTRY, PRODUCT and TIME_YEAR are dimensions. Thus, in this respect it is not necessary to provide further information in the set of metadata items than the names and dimension values. The format can be selected or defined as recognised by a person skilled in the art—it can be in accordance with e.g. XML.

The first item is 'revenue', which is defined by the database to be a measure.

The second item specifies that 'revenue' is to be displayed by monthly instances, that is TIME_MONTH is defined to be a dimension. The third item specifies the criterion that revenue is to be confined to values where country (defined to be a dimension) is Hungary. The fourth item specifies that revenue is to be confined to values where the product (defined to be a dimension) is jeans.

These metadata are collected or fetched from a storage when a user is having a so-called view displayed and requests a search for documents. A view comprises one or more presentation objects, but is explained in further detail in connection with FIG. 4. Actually, the example above corresponds to a situation where the view structure comprises only a single presentation object. It will be described in the below how to handle a set of metadata items with items from or for a view with several presentation objects. The metadata set specifies the data being displayed by the view and are thus readily available for being prepared for a search for documents. Thereby a user is released from the task of specifying the content of the metadata set or its location. This greatly reduces the number of user-interactions needed from a user to prepare a search.

Having fetched the set of metadata as exemplified above, different subsets of metadata items (from the metadata set) are prepared in step 102. The subsets can be prepared in different ways, but it is generally desired to prioritize or rank the subsets by gradually reducing and/or altering the items across the different subsets. The subsets are exemplary denoted MSS-1, MSS-2, . . . , MSS-n, where MSS-1 is a primary subset and MSS-2 through MSS-n are subordinated thereto. The exemplary content of metadata sets MSS-1, MSS-2, MSS-3, MSS-4 is shown below:

| MSS-1 | MSS-2 | MSS-3 | MSS-4 |
|---|---|---|---|
| Revenue COUNTRY | Revenue | | Revenue |
| Hungary PRODUCT | Hungary | Hungary | |
| Jeans YEAR | Jeans | Jeans | |
| 2006 | 2006 | 2006 | 2006 |

Subsequently, in step 103 respective different search requests denoted S-1, S-2, . . . , S-n are prepared from the different subsets of metadata (MSS-1, MSS-2, . . . , MSS-n).

The search requests are adapted in accordance with the interface of a search engine e.g. an interface which provides for free text search. A search engine can be any type of search engine which searches for content within the scope of a local computer, a private computer network or a portion thereof or a public network like the Internet.

Depending on a desired scope of the search an appropriate search engine can be selected. The search engine can be for instance Google Desktop™, Microsoft Desktop™ or any other search engine e.g. those categorized as so-called 'enterprise search engines'. An 'enterprise search engine' can be or is often configured to search documents stored within a private network. The terminology used in such documents may be similar to the terminology used in the data storage since they are often prepared by the same organisation.

Thereby the likelihood of obtaining search results from a relatively narrow or specific search request is increased. The search engine can search for documents in different formats e.g. in HTML format, PDF format, proprietary word processing formats, spreadsheet formats, e-mail formats etc. These documents can have content e.g. in the form of text of a word processing document. Additionally, these documents can have different properties and/or different types of properties e.g. a property stating at which date and/or time the document was modified and/or created. These properties are also denoted metadata of the documents or document metadata.

The different search engines can expose different interfaces requiring different syntax. Such interfaces may expose access to only content of the documents or also access to the document metadata or a portion of the document metadata.

In continuation of the above example, the below search requests are prepared:

| | Search request: |
|---|---|
| S-1 | "revenue country hungary product Jeans year 2006" |
| S-2 | "revenue hungary jeans 2006" |
| S-3 | "hungary jeans" |
| S-4 | "revenue" |

The search requests are formatted as string-type data where spaces and e.g. ASCII characters specify the content of the search requests. It is noted that the search requests S-3 and S-4 lacks the '2006' statement. However, other formats than string types can be used, e.g. formats according to XML or SOAP (Simple Object Application Protocol).

Metadata formatted for the search engine (or interface thereof) can be a part of the different search requests or only some of them. The metadata for the search engine can be formatted according to a specific syntax required by the search interface e.g. according to XML or SOAP. In the example, the '2006' statement can be formatted according to a given syntax.

It may be assumed that the interface accepts metadata by the following syntax: [metadata:date_modified:dd_mm_yyyy], where metadata is a word reserved by the interface which identifies that metadata is supplied; data_modified is a reserved word of an enumerated type and specifies the type of metadata; and dd_mm_yyyy is a formatting of a date which accepts the %-sign as a wildcard. Thus, e.g. S-3 and S-4 can be supplied with the statement:

metadata:date_modified:%%_%%_2006

Thus S-3 and S-4 may be:

| | |
|---|---|
| S-3* | "hungary jeans metadata:date_modified:%%_%%_2006" |
| S-4* | "revenue metadata:date_modified:%%_%%_2006" |

A specific type of metadata is selected: "data_modified". This specific type can be determined by an administrator of the system or be set up be a user. In case the specific metadata are unknown, the system can comprise a list of possible metadata items for the documents which are accessed by a trial-and-error approach. Thereby a metadata search can be performed without knowing the precise name of the metadata item.

When the different search requests have been prepared, a search for documents per search request is performed in step 104. This can be performed by submitting the search requests as exemplified above. The search requests can be submitted consecutively and unconditional on the result of a previously submitted request or a subsequent request can be submitted if a certain condition on the previous result is satisfied e.g. by stopping the chain of consecutive searches if a previous search revealed relevant search results. Here, the relevancy of search results can be determined according to a specified measure known within the field of information retrieval or computer-based searches.

In the event the search interface does not accept a syntax for searching in metadata, one search strategy is to submit a search request without the specification of the metadata. This will most likely result in a greater set of search results (documents). These documents can be retrieved and post-processed to access metadata thereof (if any) where possible e.g. by using knowledge of documents with a specified metadata structure. The documents can be stored in a repository so as to perform the search in the repository.

Subsequently, in step 105 results R-1, R-2, . . . , R-n of the performed searches are retrieved and arranged to make identification of the corresponding search request possible.

Still subsequently, in step 106 the results are displayed in prioritized order as specified by the rank of the corresponding metadata sets as explained above. It is explained in greater detail below how to display the documents.

Thus, a user can be in a process of preparing an analysis based on a specification of data which forms the content of the analysis. In that situation the analysis may reveal information which it requires further information from peripheral data sources to understand or investigate further. The numbers and figures based on which data analysis is prepared may not be able to provide such further information from its central storage. It should be understood that the central storage contains the data superset and data subset, but not necessarily (i.e. typically) documents for further investigation.

Therefore the sources for such documents are denoted peripheral sources.

Without departing from this definition, the central storage can be distributed across different physical locations and/or databases. The central storage is also denoted the data storage and the peripheral storage is also denoted the document storage.

According to the above, such further information from peripheral sources can be retrieved while the user interacts with the system to perform data analysis based on data from the central source.

Since the specification of the data for the data analysis is kept by means of metadata items in a metadata set and since different search strings are prepared from different subsets of the metadata items, so as to have different searches performed, the likelihood of retrieving search results that is relevant for the data analysis in question is increased. Since different searches are prepared it is possible to prioritize the results thereof. The searches can be initiated automatically or by a simple request from a user (e.g. by a single mouse click). Consequently, a user can perform a data analysis and easily obtain relevant results without specifying the search strings by trial-and-error.

Moreover, the user does not need to interrupt his/hers concentration in scrutinizing information by a subordinate task of phrasing—often by time consuming trial-and error—a search request.

FIG. 2 shows a first block diagram of a system according to the invention. The system 200 comprises a user interface 201 which operates in combination with a middleware component 221 and a database DB, 219 with a database interface DB IF, 218.

The middleware component 221 provides functionality of the user interface 201 and is configured to receive inputs from the user interface and provide outputs to the user interface 201. The middleware component 221 provides contents to the user interface 201 by means of among other means the database 219. The database 219 is accessed via the database interface 218.

The middleware component is also configured to submit a query to the database 219 via the database interface 218 and to retrieve a result dataset from the database 219 via the database interface. Preferably, the database interface comprises a cache memory for fast retrieval of a previously retrieved dataset.

The user interface 201 is shown in the form of a window which has a control bar 202 with controls for closing, maximizing and minimizing the window on a display. The window comprises control components in the form of an input text box 207, a track history list box 208, a presentation options box 209, and a data report 203 in which different graphical presentation objects 204,205,206 are arranged. The data report can thus be arranged as a container of the presentation objects. This data report or container is also designated a view or view structure. Different graphical presentation objects are arranged in the view, e.g. as shown a bar chart object 204, a pie chart object 205, and a table object 206. These graphical presentation objects each provides a presentation of a dataset retrieved from the database 219.

The user interface 201 and the middleware component 221 provide in combination the following functionality:

In a first situation, a user can submit a request for a data set to be presented by means of the view or data report 203. The request can be submitted in the form of a natural language or pseudo-natural language comprising words or text items which identify metadata items in the database 219. The request is processed by a metadata determining unit 214 of the middleware component 221. The metadata determining unit 214 provides an output with metadata items for identifying a dataset in the database 219. The metadata items are stored in a record in a track history memory THM, 215. Further, the metadata items are forwarded to a query maker 217 which provides a formal query according to a syntax accepted by the database interface 218. The database interface 218 retrieves the dataset identified by the metadata items, by means of the formal query, from the database 219.

The retrieved data set is provided to a report object 220 which collects the metadata items, for identifying the data set, and presentation properties for rendering a presentation of the dataset in the view 203. Additionally, the report object provides methods for interacting with the view or the graphical presentation objects thereof.

The presentation properties are provided by a presentation properties determining (PPD) unit 216 which has a first mode where presentation properties are determined automatically from the metadata items, MD, provided by the metadata determining unit 214. In a second mode the PPD unit 216 receives a user's input to modification of the presentation properties via the presentation options box 209. Thereby, the presentation can be adapted to a user's preferences. In a third mode, a combination of functionality of the first and second modes is provided.

The presentation properties provided by the PPD unit 216 are optionally stored in the record containing the metadata items of the presentation. This first situation is described in greater detail in the published patent application EP 1 477 909.

In a second situation, a user can retrieve a former request for data, in the form of metadata items, stored in a record. The user can make a choice to select the record from the track history memory 215 by means of the history list box 208 on the user interface 201. This record can be used to make a presentation or have a search performed (see below). This is described in greater detail in the published patent application EP 1 659 503.

In a third situation, a user can request further data by an action directed directly to an element of a graphical presentation object of the view. In response to detecting the action, datasets of the individual presentations of the view are changed to provide for exploring or analyzing the datasets further. This is described in greater detail in the published patent application EP 1 577 808.

In a fourth situation, a user can continue either of the above or other situations by submitting a request for a search for documents as described in connection with FIGS. 1 and 3. The request can be in the form of an activation of a graphical button on the user interface (or a button on a keyboard) or an activation of any other control (object) on the user interface.

Figure 3:
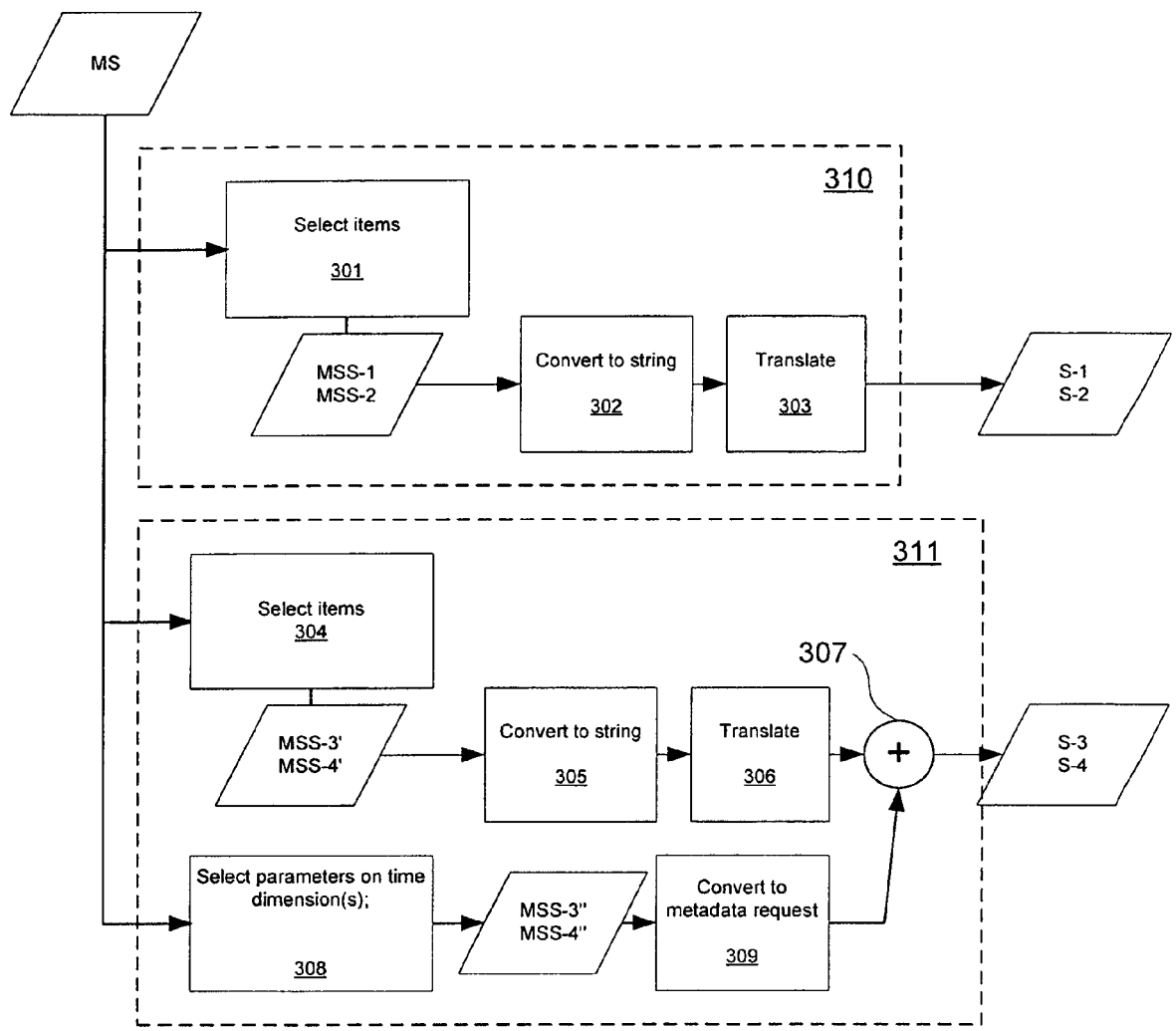
FIG. 3 shows a flowchart of preparing the different searches.

The search is prepared by a unit, PS, 212 and in accordance with the flowchart shown in FIGS. 1 and 3. When the search is prepared by unit, PS, 212 and different search requests are prepared, the search requests are forwarded to an interface of a search engine SIF, 213. Search results returned from the search engine via the search interface 213 are provided via unit 212 to the report object 220 for display on the user interface.

Reverting to the first situation, a user can request data by means of the input text box 207 wherein the user can write a question in a natural language in a preferred language, e.g. the English language. From a user's perspective this question constitutes a query to the database 213. In an exemplary embodiment the database 213 can contain the following data items, wherein the data items are categorized as measures or dimensions and wherein a dimension exists at different levels such as day, month, and year:

| Measures: | Dimensions: |
|---|---|
| 'REVENUE' | 'time' (level 0: Year; level 1: Month; level 2: Day) |
| 'cost' | 'Customer' (level 0: Group; level 1: Name) |
| 'CONTRIBUTION-MARGIN' | 'Product' (level 0: group; level 1: Name) |
| 'revenue' | 'Country' |
| 'budget' | 'BusinessUnit' |

Thereby e.g. the following questions can be asked:
1) I would like to see 'cost' grouped by 'time, month'
2) I would like to see 'REVENUE' grouped by 'time, month', 'customer, group' and 'product, name'
3) I would like to see 'REVENUE' for year 2004
4) I would like to see 'country'

A question like the above ones are forwarded to a metadata determination unit 214 which is arranged to identify metadata items and their category and levels by parsing the question. The dimension 'time' can alternatively be named time_year; time_month; time_day. Thereby the concept of 'levels' can be avoided. This also applied to the other dimensions with the appropriate changes.

Based on the identified metadata items, the metadata determination unit 214 is able to look up a track history memory 215 of previously used combinations of metadata and presentation properties. The contents of the storage memory 215 can have the following form as shown in table 1:

TABLE 1

| Data | Presentation | Frequency |
|---|---|---|
| Time, Level 1 REVENUE | type = Barchart; legend = off; labels = off; 3D-effects = Orthogonal | 3 |
| Country; CONTRIBUTION-MARGIN Margin | type = map; legend = off; labels = on; 3D-effects = None | 3 |
| Customer, Level 0; REVENUE; Cost; CONTRIBUTION-MARGIN Margin | Type = Crosstab; legend = off; labels = off; 3D-effects = None | 2 |
| ... | ... | ... |

By searching the storage memory 210, with contents as shown in table 1 above, for a match on the data items and levels identified from the question, it is possible to determine whether a previous presentation matching the question has been used. Thereby preferred presentation properties can be found. If for instance it is determined that a question involves the data item 'time, level 1'and ' REVENUE', it can be deduced that the preferred presentation of these data items is a bar chart with properties as shown in table 1 above.

Presentation properties are determined by the presentation determining unit 216 based on the result of the search for matching data items and levels. The determined presentation properties are stored in a presentation memory object 220.

The metadata determining unit 214 converts the question or the metadata, as the case may be, to a query that can be submitted to a database 219 via a database connection. In response to the query, the database provides a result dataset. This result dataset is sent to a presentation memory object 220. Thereby the result data set and the presentation properties are handled in the same memory object 220.

Reverting to a more general aspect, the metadata items are codes that make it possible to identify a data subset from a data superset stored in a database. To make population, maintaining etc. more intuitive the database conforms to a single so-called base language which represents a language of items in the database. This base language could be the English language, but could by any language including artificial languages. The metadata items are basically given by codes which identify the items in the database. To continue the intuitive aspect, the codes are given in the base language.

In the example given, the metadata items are given by codes in the form of words from the English language. This makes it more intuitive to request and interpret data retrieved via the metadata items.

In an embodiment, an electronic dictionary or translation service is used to translate the words of the metadata items to and from a user language, which can be different form the base language. This is described in greater detail below. The user language is typically a natural language e.g. English, German or French.

FIG. 3 shows a flowchart of preparing different searches. The flowchart comprises steps also shown in connection with the flowchart shown in FIG. 1.

The set of metadata, MS, is converted to different search requests S-1, S-2, S-3, and S-4. The first two search requests are prepared via a first route 310 of the flowchart and the last two search requests are prepared via a second route 311.

The first route comprises a step 301 where items from the metadata set, MS, are selected. For preparing the first search request, S-1, step 301 is in a first mode where all items of the metadata set, MS, are selected to create the metadata subset MSS-1. In subsequent step 302 the metadata subset MSS-1 (which comprises all items) are converted to a string of words separated by spaces. The words are the names and parameters (metadata items) of the metadata subset.

In the event user languages different from the base language are supported, a step 303 of translating the words (in base language) of the string to words (in user language) for the search request S-1 is performed. The step of translating is performed according to an indication of which user language to translate into. This indication of the user language can be set by an administrator of the system. This indication can also comprise information whether such user languages are supported. Translation can be performed as described in the patent application EP 1 353 280. As a result of the translation, the first search request S-1 is created. Exemplary content of S-1 can be seen in the table above. It should be noted that the database can comprise a first type of words or metadata names or parameters which an administrator of the database provides in different languages; e.g. names of measures and dimensions. The database can also comprise a second type of words that designates instances of dimensions; in the example above e.g. 'Hungary', 'Jeans' and '2006' (which it may not be necessary to translate).

These words can be translated when, and if, needed according to a language translation with a limited number of or no synonyms. In the latter event there is established a translation based on a dictionary with one-word-to-one-word translation.

In an embodiment primary and subordinate user languages can be specified.

In that event, one or more of the search requests e.g. all of the search requests can be prepared in different language versions. Thereby, a user can be provided with search results in say both English and German. Especially when not all language versions of the search requests convey results, the ones that convey results can be used instead of preparing the conclusion that no results were found. When one or more user languages are specified the likelihood of retrieving personal documents e.g. emails is increased. Personal documents may very well be related to the data being analysed by the user since both the documents and analyses belong to the scope of activity of the user.

For preparing the second search request, S-2, step 301 is in a second mode where all items, except names of measures of the metadata set, MS, are selected to create the metadata subset MSS-2. In subsequent step 302 the metadata subset MSS-2 (which comprises names of dimensions and parameters) are converted to a string of words separated by spaces. The words are the names and parameters (metadata items) of the metadata subset. As described above, the words can be translated to conform to a user language. Exemplary content of S-2 can be seen in the table above.

The second route comprises a step 304 where all parameters except from parameters on a time dimension from the metadata set, MS, are selected.

For preparing the third search request, S-3, step 304 is in a first mode where all parameters, but the parameters on a time dimension of the metadata set, MS, are selected to create the metadata subset MSS-3. However, in step 308 the parameter(s) on the time dimension is (are) selected.

In step 305 all parameters, but the parameters on a time dimension are converted to a string of words as described above. Subsequently, the words can be translated as described above. The result thereof can be as shown for S-3 in the table above.

In step 309 the selected parameters on a time dimension are converted to a metadata request that is formatted according to an interface of the search engine. The string and the metadata request are provided in combination as the third search request. The result thereof can be as shown for S-3* above.

For preparing the fourth search request, S-4, step 304 is in a second mode where all names of dimensions of the metadata set, MS, are selected to create the metadata subset MSS-4. In step 308 the parameter(s) on the time dimension is (are) selected. The fourth search request is provided by combining the string and the metadata request. The result thereof can be as shown for S-4* above.

Figure 4:
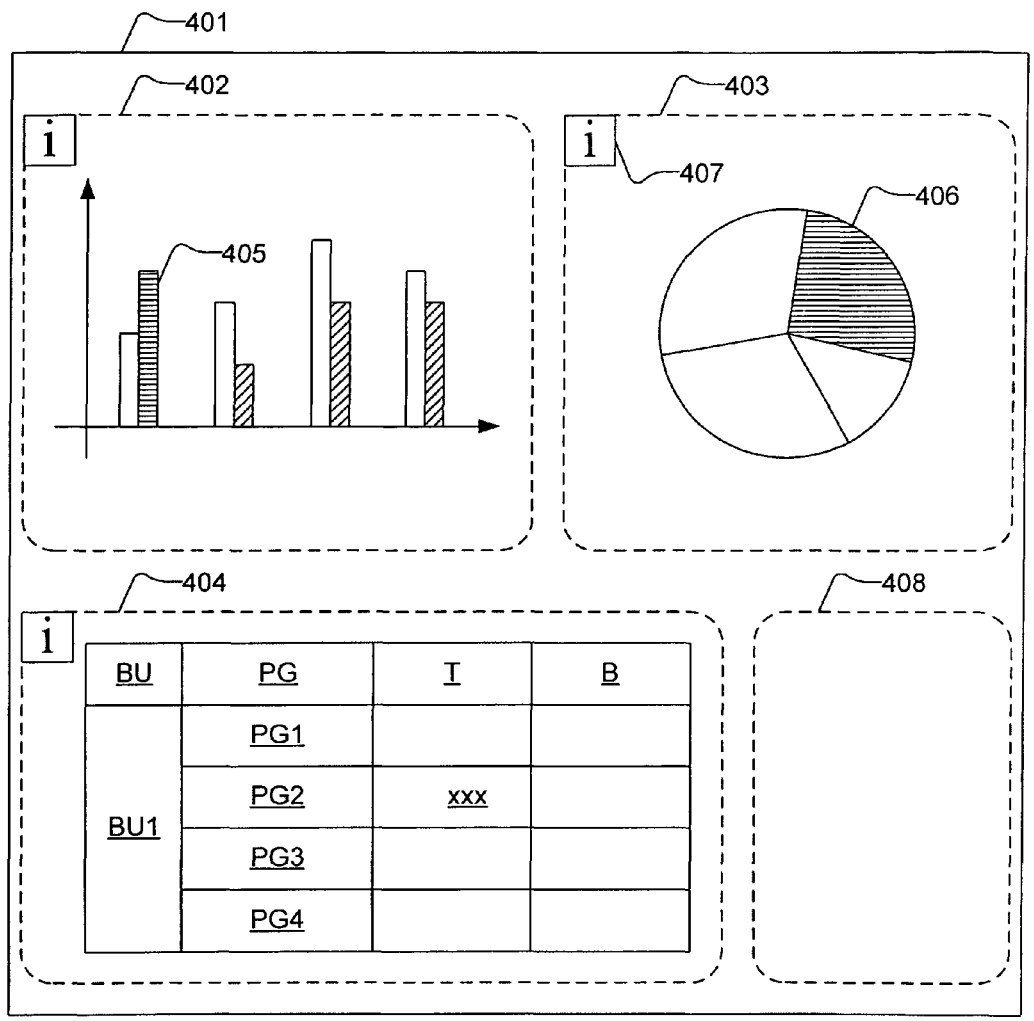
FIG. 4 shows a view structure.

FIG. 4 shows a view. The view shows the view of FIG. 1 in greater detail and with reference to the above-mentioned measures and dimensions. The view structure 401 comprises a first graphical presentation object 402 of a bar-graph type showing values of the measures 'CONTRIBUTION-MARGIN' (hatched bars) and 'Revenue' (blank bars) along the dimension 'TIME_MONTH'. Further, the view structure 401 comprises a second graphical presentation object 403 of a pie-chart type showing values of the measure 'CONTRIBUTION-MARGIN' along the dimension 'BUSINESS-UNIT'. Still further, the view structure 402 comprises a third graphical presentation object 404 of a table type showing the measures 'REVENUE' and 'BUDGET' along the dimensions 'BUSINESS-UNIT' and 'PRODUCT-GROUPS'.

The view is obtained under situation 1 described in connection with FIG. 1, where a question is input to identify the metadata items of the view. Alternatively, a previously used view is re-established from partial information of the metadata, given in the question. Yet, alternatively, the view is provided by recalling a former view.

The data for the view are defined by means of a set metadata items for each presentation object and a common set of items.

1. {REVENUE; CONTRIBUTION-MARGIN; TIME_MONTH; COUNTRY="Hungary"; TIME_YEAR="2006"}
2. {CONTRIBUTION-MARGIN; BUSINESS-UNIT; COUNTRY="Hungary"; TIME_YEAR="2006"}
3. {REVENUE; BUDGET; COUNTRY="Hungary"; TIME_YEAR="2006"} where the items COUNTRY="Hungary" and TIME_YEAR="2006" belong to the common set of items. The metadata sets 1, 2 and 3 above are combined in a single set of metadata items to represent the data of a view with three objects. In an embodiment the items are converted for the search as described above irrespective of which of the sets 1, 2 and 3 they belong to. Thus, all other things being equal the search requests will comprise more terms. In another embodiment, a search as described above can be initiated for only selected of the above sets 1, 2 and 3.

The dimension values 'Hungary' and '2006' on the dimensions COUNTRY and TIME_YEAR, respectively, are also denoted background criteria since they are, in the example, common for the presentations of a view corresponding to the respective metadata sets 1-3 above. However, it is clear that the metadata sets can have individual dimension values or criteria, which would apply to a single presentation object. These aspects are described in greater detail in the published patent application EP 1 659 503.

Additionally, the view comprises a graphical presentation object 408 of a type showing a list of documents. The list of documents comprises documents obtained by performing a search as described above. The documents can be shown in the list as desired e.g. showing the name of the document and a title of the document. A fraction of the document can also be shown for the user to more readily obtain a perception of the contents of the document.

The documents are denoted D11, D12, D21, D31, D32. The first digit illustrates the number of the search result from which the document is retrieved. The second digit illustrates the rank of the document within the search result. The four lower case d-letters in the figure illustrate that the titles of the documents are shown. The documents can be accessed directly from the graphical presentation object 408.

It is possible to explicitly assign documents to a specific instance of the data analysis. The specific instance of the data analysis is represented by the content of a metadata set. Such a document can be a document created by the user in the context of the data analysis or a document retrieved e.g. from a search. The document can be assigned by adding information to the document that will ensure that it will be identified as falling within the scope of the search request (assuming the document is found). Alternatively, the set of metadata can be assigned a link to the document.

Documents can be assigned to a specific instance of the data analysis via the portions 407, of the presentations objects, designated by a lower case 'i'.

The term OLAP designates a category of databases, applications and technologies that allow the collection, storage, manipulation and reproduction of multidimensional data, with the goal of data analysis.

Metadata is information about a particular data set which may describe, for example, how, when, and by whom it was received, created, accessed, and/or modified and how it is formatted.

The invention claimed is:

1. A computer-implemented method, comprising:
making by a processor, on a display device, a presentation of a dataset with structured data, said structured data being selected from a first database based on a combination of metadata items that correspond to a respective dimension, measure or measure value;
automatically selecting by the processor a plurality of subsets of metadata items from the metadata items used to make the presentation, wherein said plurality of subsets are comprised of different combinations of the metadata used to make the presentation;
automatically converting by the processor each of the selected subsets of metadata items into a corresponding plurality of search requests;
submitting by the processor the search requests to a search engine to search for documents located in a second database; and
making by the processor, on the display device, a presentation of a plurality of search results corresponding to the search requests.

2. The computer-implemented method according to claim 1, wherein the searches are performed in a peripheral data source.

3. The computer-implemented method according to claim 1, wherein the search requests comprise requests directed to a search for metadata of documents.

4. The computer-implemented method according to claim 3, comprising the step of converting a metadata item related to a time dimension to a search request that address metadata of documents.

5. The computer-implemented method according to claim 1, comprising the step of converting the metadata items to words and translating the words from one language into another language.

6. The computer-implemented method according to claim 1, comprising the step of converting the metadata items into search requests includes removing and/or altering the metadata items from the combination of metadata items, selected for the different search requests.

7. The computer-implemented method according to claim 1, further comprising modifying a document to supply it with content of a search request so as to ensure information co-occurring in the search request and the document.

8. The computer-implemented method according to claim 1, further comprising establishing a link from the search request to the document and/or from the document to the search request.

9. A computer-readable medium encoded with a program which, when loaded into a computer, makes the computer perform the method according to claim 1.

10. A computer-readable storage device encoded with a program which, when executed by a processor, causes the computer to perform the method according to claim 1.

11. A computer-implemented method, comprising:
requesting a search engine to perform a search assigned to a search string to provide a search result; and
making a presentation of the search result;
wherein:
the search string is automatically prepared by taking a set of metadata items from a superset of metadata items that correspond to a respective dimension, measure or measure value; and
the combination of metadata items in the set of metadata items defines a dataset from within the data superset;
and wherein:
different search requests are automatically prepared from a plurality of subsets of the set of metadata items for different searches;
said plurality of subsets are comprised of different combinations of the metadata items from the set of metadata items; and
the search result comprises different result sets corresponding to the different search requests.

12. The computer-implemented method according to claim 11, wherein the data superset is stored in a first database and wherein the different searches are performed in a peripheral data source.

13. The computer-implemented method according to claim 11, wherein the search requests comprise requests directed to a search for metadata of documents.

14. The computer-implemented method according to claim 13, comprising the step of converting a metadata item related to a time dimension into a search request that address metadata of documents.

15. The computer-implemented method according to claim 11, comprising the step of converting metadata items to words and translating the words from one language into another language.

16. The computer-implemented method according to claim 11, comprising the step of preparing the different search requests by removing and/or altering the metadata items, from the metadata set, selected for the different search requests.

17. The computer-implemented method according to claim 11, further comprising modifying a document to supply it with content of a search request so as to ensure information co-occurring in the search request and the document.

18. The computer-implemented method according to claim 11, further comprising establishing a link from the search request to the document and/or from the document to the search request.

19. A computer-readable data storage device encoded with a program which, when executed by a computer, makes the computer perform a method comprising:
  requesting a search engine to perform a search assigned to a search string to provide a search result; and
  making a presentation of the search result on a display device;
  wherein:
    the search string is automatically prepared by taking a set of metadata items from a superset of metadata items that correspond to a respective dimension, measure or measure value; and
    the combination of metadata items in the set of metadata items defines a dataset from within the data superset;
  and wherein:
    different search requests are automatically prepared from a plurality of subsets of the set of metadata items for different searches;
    said plurality of subsets are comprised of different combinations of the metadata items from the set of metadata items; and
    the search result comprises different result sets corresponding to the different search requests.

20. A computer comprising:
  a processor;
  a computer-readable data storage device;
  a first database;
  a second database; and
  a display device,
  wherein the computer-readable data storage device is encoded with program instructions that, when executed by the processor, control the computer to perform a method of providing a search result, said method comprising:
    requesting a search engine to perform a search assigned to a search string to provide a search result;
    capturing the search result; and
    making a presentation of the search result on a display device;
  wherein:
    the search string is automatically prepared by taking a set of metadata items from a superset of metadata items that correspond to a respective dimension, measure or measure value; and
    the combination of metadata items in the set of metadata items defines a dataset from within the data superset;
  and wherein:
    different search requests are automatically prepared from a plurality of subsets of the set of metadata items for different searches;
    said plurality of subsets are comprised of different combinations of the metadata items from the set of metadata items; and
    the search result comprises different result sets corresponding to the different search requests.

* * * * *